United States Patent
Mallampati (10) Patent No.: US 11,878,808 B2
(45) Date of Patent: Jan. 23, 2024

(54) NACELLE INLET STRUCTURE FITTING WITH LOCATOR CLIP AND HOIST BRACKET

(71) Applicant: Rohr, Inc., Chula Vista, CA (US)

(72) Inventor: Pratap Mallampati, Bengaluru (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/131,228

(22) Filed: Apr. 5, 2023

(65) Prior Publication Data
US 2023/0348084 A1  Nov. 2, 2023

(30) Foreign Application Priority Data
Apr. 5, 2022 (IN) .............................. 202211020554

(51) Int. Cl.
*B64D 29/06* (2006.01)
*B64D 29/00* (2006.01)
*F01D 25/28* (2006.01)
*B64D 29/08* (2006.01)

(52) U.S. Cl.
CPC .............. *B64D 29/06* (2013.01); *B64D 29/00* (2013.01); *B64D 29/08* (2013.01); *F01D 25/28* (2013.01)

(58) Field of Classification Search
CPC ........ B64D 29/06; B64D 29/00; B64D 29/08; F01D 25/28; F01D 25/24; F02C 7/20; F05D 2230/60; F05D 2230/70; F02K 1/78; F02K 1/80
See application file for complete search history.

(56) References Cited

U.S. PATENT DOCUMENTS

| | | | | |
|---|---|---|---|---|
| 2,421,689 A | * | 6/1947 | Elkin ..................... | B64D 29/08 244/130 |
| 4,437,627 A | | 3/1984 | Moorehead | |
| 7,147,185 B2 | * | 12/2006 | Beaufort ................ | B64D 29/06 244/53 B |
| 7,334,393 B2 | * | 2/2008 | Porte ........................ | F02K 1/70 60/226.1 |
| 8,333,344 B2 | * | 12/2012 | Vauchel ................. | B64D 29/06 244/1 N |

(Continued)

FOREIGN PATENT DOCUMENTS

FR 3101616 B1 9/2021

OTHER PUBLICATIONS

EP Search Report for EP Application No. 23166816.1 dated Aug. 22, 2023.

*Primary Examiner* — Gerald L Sung
*Assistant Examiner* — Rene D Ford
(74) *Attorney, Agent, or Firm* — Getz Balich LLC (57) ABSTRACT

An assembly is provided for an aircraft propulsion system. This aircraft propulsion system assembly includes a nacelle. The nacelle includes an inlet structure and a cowl. The inlet structure extends axially in a first direction along a centerline to an inlet structure aft end. The inlet structure includes a clip and a hoist bracket integrated with the clip. The clip is at the inlet structure aft end. The clip includes a locator receptacle. The hoist bracket is configured to provide a structural lift point for the inlet structure during assembly and/or disassembly of the nacelle. The cowl extends axially in a second direction along the centerline to a cowl forward end. The cowl includes a locator at the cowl forward end. The locator includes a protrusion received by the locator receptacle.

20 Claims, 9 Drawing Sheets

(56) References Cited

U.S. PATENT DOCUMENTS

| | | | |
|---|---|---|---|
| 8,567,712 B2 * | 10/2013 | Porte | B64D 29/08 |
| | | | 244/129.4 |
| 8,740,137 B2 * | 6/2014 | Vauchel | F02C 7/04 |
| | | | 244/54 |
| 10,087,781 B2 * | 10/2018 | Kioua | F01D 25/24 |
| 2018/0170566 A1 | 6/2018 | Paolini | |
| 2019/0113002 A1 | 4/2019 | Sanz Martinez | |
| 2020/0377221 A1 * | 12/2020 | Boileau | B64D 29/06 |
| 2020/0378341 A1 | 12/2020 | Boileau | |

* cited by examiner

NACELLE INLET STRUCTURE FITTING WITH LOCATOR CLIP AND HOIST BRACKET

This application claims priority to Indian Patent Appln. No. 202211020554 filed Apr. 5, 2022, which is hereby incorporated herein by reference in its entirety.

BACKGROUND

1. Technical Field

This disclosure relates generally to an aircraft propulsion system and, more particularly, to an interface between an inlet structure and a cowl for a nacelle.

2. Background Information

An aircraft propulsion system may include a turbofan engine housed within a nacelle. The nacelle includes an inlet structure and a plurality of fan cowls. When closed, the fan cowls may interface with the inlet structure through a V-blade assembly. This V-blade assembly may facilitate an axial load path between the fan cowls and the inlet structure. Various types and configurations of fan cowl—inlet structure interfaces are known in the art. While these known interfaces have various benefits, there is still room in the art for improvement.

SUMMARY OF THE DISCLOSURE

According to an aspect of the present disclosure, an assembly is provided for an aircraft propulsion system. This aircraft propulsion system assembly includes a nacelle. The nacelle includes an inlet structure and a cowl. The inlet structure extends axially in a first direction along a centerline to an inlet structure aft end. The inlet structure includes a clip and a hoist bracket integrated with the clip. The clip is at the inlet structure aft end. The clip includes a locator receptacle. The hoist bracket is configured to provide a structural lift point for the inlet structure during assembly and/or disassembly of the nacelle. The cowl extends axially in a second direction along the centerline to a cowl forward end. The cowl includes a locator at the cowl forward end. The locator includes a protrusion received by the locator receptacle.

According to another aspect of the present disclosure, another assembly is provided for an aircraft propulsion system. This aircraft propulsion system assembly includes a nacelle. The nacelle includes an inlet structure and a cowl. The inlet structure extends axially along and circumferentially about a centerline. The inlet structure includes a clip and a hoist bracket configured with the clip in a monolithic body. The hoist bracket is configured to provide a structural lift point for the inlet structure during assembly and/or disassembly of the nacelle. The cowl extends axially along and circumferentially about the centerline. The cowl is configured to pivot between a closed position and an open position. The cowl includes a locator configured to: coupled with the clip when the cowl is in the closed position; and uncoupled from the clip when the cowl is in the open position.

According to still another aspect of the present disclosure, another assembly is provided for an aircraft propulsion system. This aircraft propulsion system assembly includes a nacelle inlet structure extending axially along a centerline between a forward end and an aft end. The nacelle inlet structure includes an inlet lip, an inner barrel, an outer barrel, a bulkhead and a fitting. The inlet lip is at the forward end. The inner barrel is connected to the inlet lip. The outer barrel is connected to the inlet lip and circumscribes the inner barrel. The bulkhead extends radially between and is connected to the inner barrel and the outer barrel. The fitting is at the aft end. The fitting is connected to the bulkhead. The fitting includes a locator clip and a hoist bracket. The locator clip includes a receptacle configured to receive a locator for a nacelle cowl. The hoist bracket is configured to provide a structural lift point for connecting to a hoist system during nacelle assembly and/or nacelle disassembly.

The nacelle inlet structure may also include a support structure coupling the outer barrel to the bulkhead.

The aircraft propulsion system assembly may also include a hoist system coupled to the hoist bracket. The hoist system may be configured to hold the inlet structure during the assembly and/or the disassembly of the nacelle.

The hoist system may include a hoist fixture and a hoist. The hoist fixture may be coupled to the hoist bracket and hold the inlet structure. The hoist may be coupled to the hoist fixture.

The aircraft propulsion system assembly may also include a fastener mated with a fastener aperture in the hoist bracket during the assembly and/or the disassembly of the nacelle. The fastener may project radially outward from the inlet structure.

The aircraft propulsion system assembly may also include a plug mated with a fastener aperture in the hoist bracket during operation of the aircraft propulsion system.

The hoist bracket may be axially covered by the cowl.

The clip and the hoist bracket may be configured together in a monolithic body.

The inlet structure may also include a fitting. The fitting may include a base, a flange and the clip. The base may extend axially between and may be connected to the flange and the clip. The base may include the hoist bracket. The flange may project radially inward from the base.

The inlet structure may also include a fitting. The fitting may include a base and a flange. The locator receptacle may extend radially through the base. The hoist bracket may include a bracket receptacle that extends radially through the base. The flange may be connected to and may project radially inward from the base.

The inlet structure may also include a bulkhead and an outer barrel. The outer barrel may circumscribe and may be connected to the bulkhead. A fitting, which includes the clip and the hoist bracket, may be connected to the bulkhead.

The locator receptacle may be configured as or otherwise include a groove formed by the clip. The protrusion may project radially into the groove.

The locator receptacle may be configured as or otherwise include a slot. The protrusion may project radially through the slot.

The inlet structure may also include an outer barrel. The cowl may also include an outer panel circumscribing the clip, the hoist bracket and the locator. The outer panel may be axially abutted with the outer barrel.

The cowl may be configured to move between a closed position and an open position. The protrusion may be received by the locator receptacle when the cowl is in the closed position. The protrusion may be outside of the locator receptacle when the cowl is in the open position.

The clip and the locator may be configured to provide an axial load path between the inlet structure and the cowl when the locator is received by the locator receptacle.

The aircraft propulsion system assembly may also include a hoist fixture outside of the inlet structure during the assembly and/or the disassembly of the nacelle. The hoist fixture may be coupled to the inlet structure through the hoist bracket.

The aircraft propulsion system assembly may also include a hoist pin mated with an aperture in the hoist bracket during the assembly and/or the disassembly of the nacelle. The hoist pin may project radially out from an exterior of the inlet structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
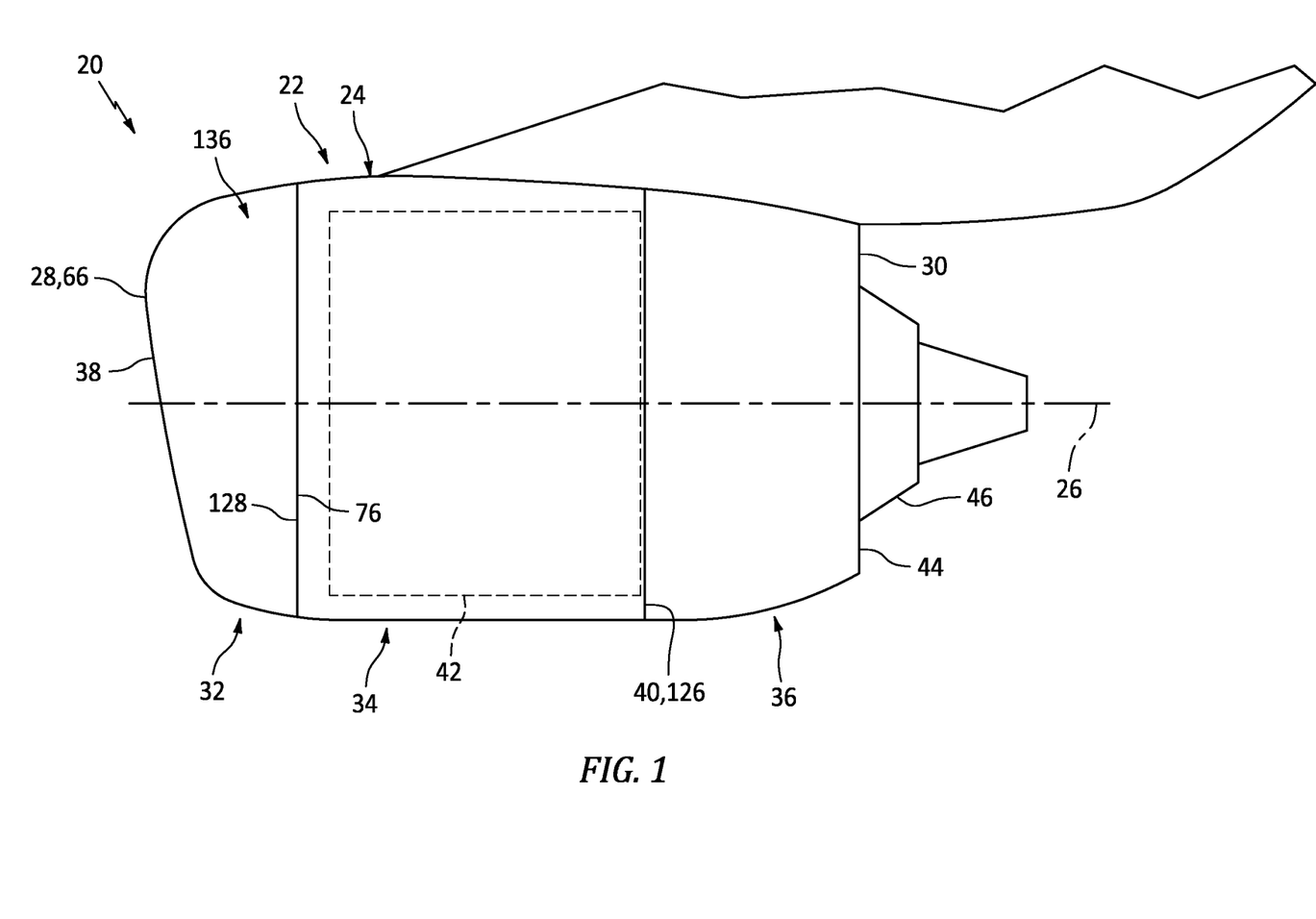
FIG. 1 is a side illustration of an aircraft propulsion system.

FIG. 1 illustrates a propulsion system 20 for an aircraft. This aircraft propulsion system 20 includes a nacelle 22 and a gas turbine engine. The gas turbine engine may be configured as a turbofan engine, a turbojet engine or any other type of gas turbine engine capable of propelling the aircraft during flight.

The nacelle 22 is configured to house and provide an aerodynamic cover for the gas turbine engine. An outer structure 24 of the nacelle 22 extends axially along an axial centerline 26 of the aircraft propulsion system 20 between a forward end 28 of the nacelle 22 and an aft end 30 of the outer structure 24. The nacelle 22 of FIG. 1 includes a nacelle inlet structure 32, one or more nacelle (e.g., fan) cowls 34 (one such cowl visible in FIG. 1) and a nacelle aft structure 36, which aft structure 36 may be configured as part of or include a thrust reverser system.

As described below in further detail, the inlet structure 32 is disposed at the nacelle forward end 28. The inlet structure 32 is configured to direct a stream of air through an inlet opening 38 (see FIG. 2) at the nacelle forward end 28 and into a fan section of the gas turbine engine.

The cowls 34 are disposed axially along the centerline 26 between the inlet structure 32 and the aft structure 36. Each cowl 34 of FIG. 1, in particular, is disposed at an aft end 40 of a stationary portion of the nacelle 22, and extends axially forward along the centerline 26 to the inlet structure 32. Each cowl 34 is generally axially aligned with the fan section. The cowls 34 of FIG. 1 are configured to provide an aerodynamic covering for a fan case 42. This fan case 42 circumscribes the fan section and partially forms an outer peripheral boundary of a bypass flowpath of the aircraft propulsion system 20.

Figure 3A:
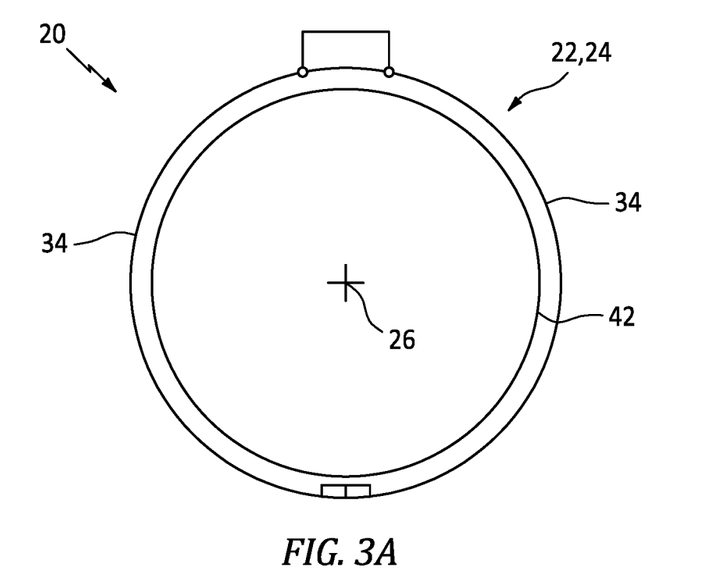
FIG. 3A is a schematic cross-sectional illustration of the propulsion system assembly with its cowls in closed positions.
Figure 3B:
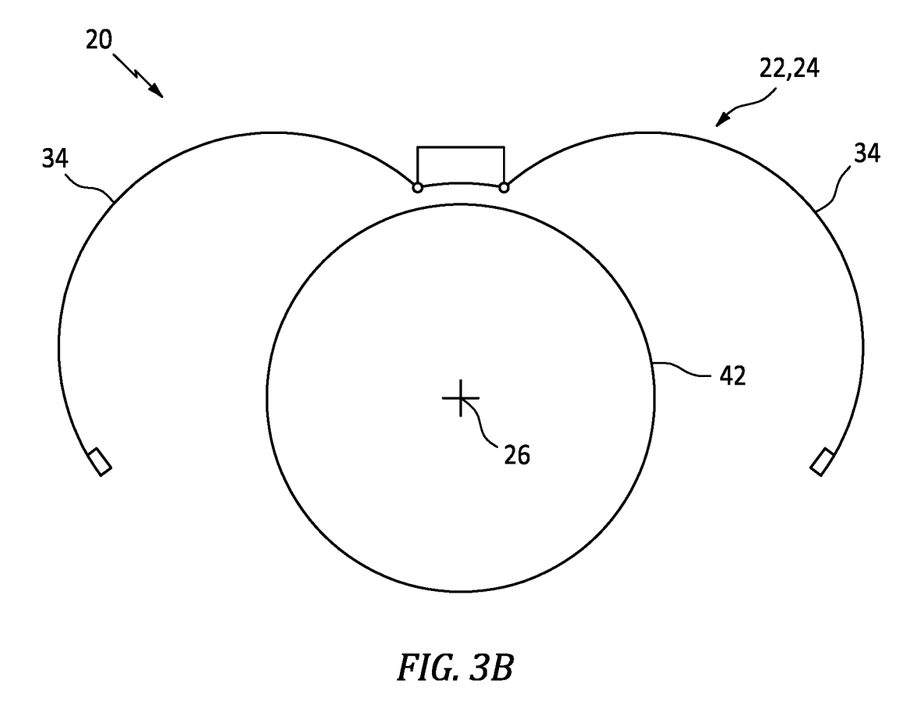
FIG. 3B is a schematic cross-sectional illustration of the propulsion system assembly with its cowls in open positions.

The term "stationary portion" is used above to describe a portion of the nacelle 22 that is stationary during propulsion system operation; e.g., during takeoff, aircraft flight and landing. However, the stationary portion may be otherwise movable for propulsion system inspection/maintenance; e.g., when the aircraft propulsion system 20 is non-operational. Each of the cowls 34, for example, may be configured to provide access to one or more components of the gas turbine engine such as the fan case 42 and/or peripheral equipment configured with the fan case 42 for inspection, maintenance and/or otherwise. For example, referring to FIGS. 3A and 3B, each of the cowls 34 may be moveably (e.g., pivotally) mounted with the aircraft propulsion system 20 by, for example, a pivoting hinge system. Each cowl may thereby be movable (e.g., pivotable) between a closed position (see FIG. 3A) and an open position (see FIG. 3B).

The aft structure 36 of FIG. 1 is disposed at the outer structure aft end 30. The aft structure 36 is configured to form a bypass nozzle 44 for the bypass flowpath with an inner structure 46 of the nacelle 22; e.g., an inner fixed structure (IFS). The aft structure 36 may include one or more translating sleeves for the thrust reverser system. The present disclosure, however, is not limited to such a translatable sleeve thrust reverser system, or to an aircraft propulsion system with a thrust reverser system.

Figure 2:
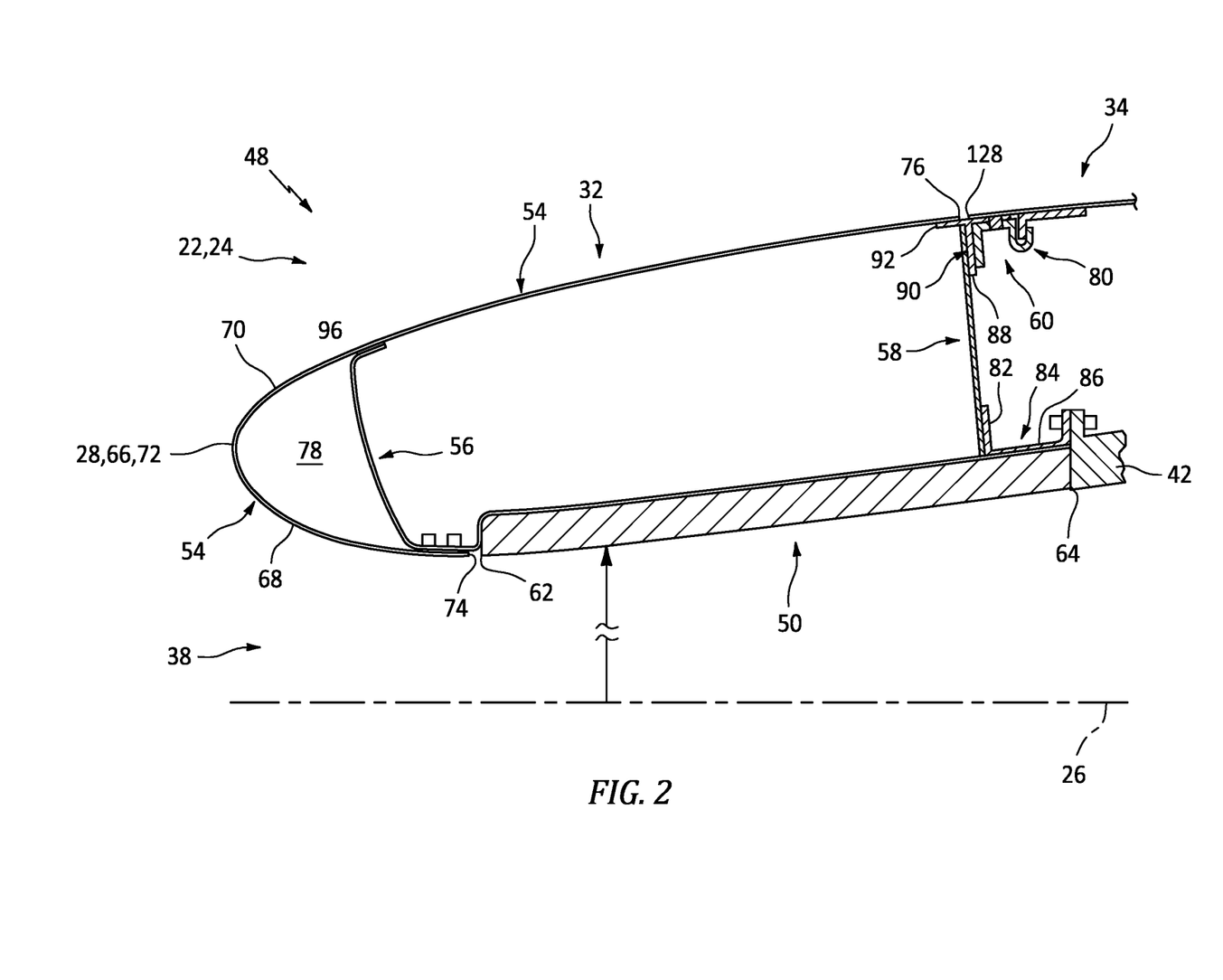
FIG. 2 is a side sectional illustration of an assembly for the aircraft propulsion system.

FIG. 2 is a side sectional illustration of an assembly 48 for the aircraft propulsion system 20. This propulsion system assembly 48 includes the inlet structure 32, the cowls 34 (one such cowl visible in FIG. 2) and the fan case 42. The inlet structure 32 of FIG. 2 includes a tubular inner barrel 50, an annular inlet lip 52, a tubular outer barrel 54, one or more bulkheads 56 and 58 and one or more locator clip-hoist bracket fittings 60 (one such fitting visible in FIG. 2); e.g., one or more fittings 60 for each cowl 34.

The inner barrel 50 extends circumferentially about (e.g., completely around) the centerline 26. The inner barrel 50 extends axially along the centerline 26 between a forward end 62 of the inner barrel 50 and an aft end 64 of the inner barrel 50.

The inner barrel 50 may be configured to attenuate noise generated during propulsion system operation and, more particularly for example, noise generated by rotation of a propulsor; e.g., a fan in the fan section. The inner barrel 50 of FIG. 2, for example, includes a tubular acoustic panel or an array of arcuate acoustic panels arranged circumferentially about the centerline 26. Each acoustic panel may include a porous (e.g., honeycomb) core bonded between an inner perforated face sheet and an outer non-perforated back sheet, where the perforated face sheet faces radially inward towards the centerline 26 and provides a peripheral outer boundary for an axial portion of the flowpath. Of course, various other acoustic panel types and configurations are known in the art, and the present disclosure is not limited to any particular ones thereof.

The inlet lip 52 forms a leading edge 66 of the nacelle 22 as well as the inlet opening 38 to the flowpath. The inlet lip 52 has a cupped (e.g., generally U-shaped or V-shaped) cross-sectional geometry when viewed, for example, in a reference plane parallel with and/or coincident with the centerline 26. The inlet lip 52 and its cupped cross-sectional geometry extend circumferentially about (e.g., completely around) the centerline 26. The inlet lip 52 includes an inner lip skin 68 and an outer lip skin 70, where the inner lip skin 68 and the outer lip skin 70 may be formed together from a generally continuous sheet of material.

The inner lip skin 68 extends axially along the centerline 26 from an intersection 72 with the outer lip skin 70 at the nacelle forward end 28 to the inner barrel 50, which intersection 72 may be at an axially forwardmost point on the inlet lip 52. At (e.g., on, adjacent or proximate) an aft end 74 of the inner lip skin 68, the inner lip skin 68 is attached to the inner barrel 50 at its forward end 62. The inner lip skin 68, for example, may be attached to the inner barrel 50 through an inner portion of the forward bulkhead 56 where, for example, the inner lip skin 68 is fastened to the forward bulkhead 56 and the inner barrel 50 is separately fastened to the forward bulkhead 56. Of course, various other joints and/or interfaces between some or all of the components 50, 56 and/or 68 are possible.

The outer lip skin 70 extends axially along the centerline 26 from the intersection 72 with the inner lip skin 68 at the nacelle forward end 28 to the outer barrel 54. The outer lip skin 70 is connected to (e.g., formed integral with or otherwise attached to) the outer barrel 54. The outer lip skin 70, for example, may be attached to the outer barrel 54 through an outer portion of the forward bulkhead 56 where, for example, the outer lip skin 70 is fastened to the forward bulkhead 56 and the outer barrel 54 is separately fastened to the forward bulkhead 56. Of course, various other joints and/or interfaces between some or all of the components 54, 56 and/or 70 are possible.

The outer barrel 54 extends circumferentially about (e.g., completely around) the centerline 26. The outer barrel 54 extends axially along the centerline 26 in an aft direction from the inlet lip 52 and its outer lip skin 70 to an aft end 76 of the outer barrel 54. The outer barrel 54 may thereby axially and circumferentially overlap the inner barrel 50.

The forward bulkhead 56 is arranged with the inlet lip 52, and may form a forward cavity 78 with the inlet lip 52. The forward bulkhead 56 of FIG. 2, for example, extends circumferentially about (e.g., completely around) the centerline 26. This forward bulkhead 56 extends radially between and its connected (e.g., mechanically fastened, bonded and/or otherwise attached) to the inner lip skin 68 at its aft end 74 and the outer lip skin 70 at an intersection between the outer lip skin 70 and the outer barrel 54. The forward bulkhead 56, of course, may alternatively extend radially (as well as axially) between and/or be connected (e.g., directly or indirectly) to the inner barrel 50 and/or the outer barrel 54 proximate the inlet lip 52.

Figure 4:
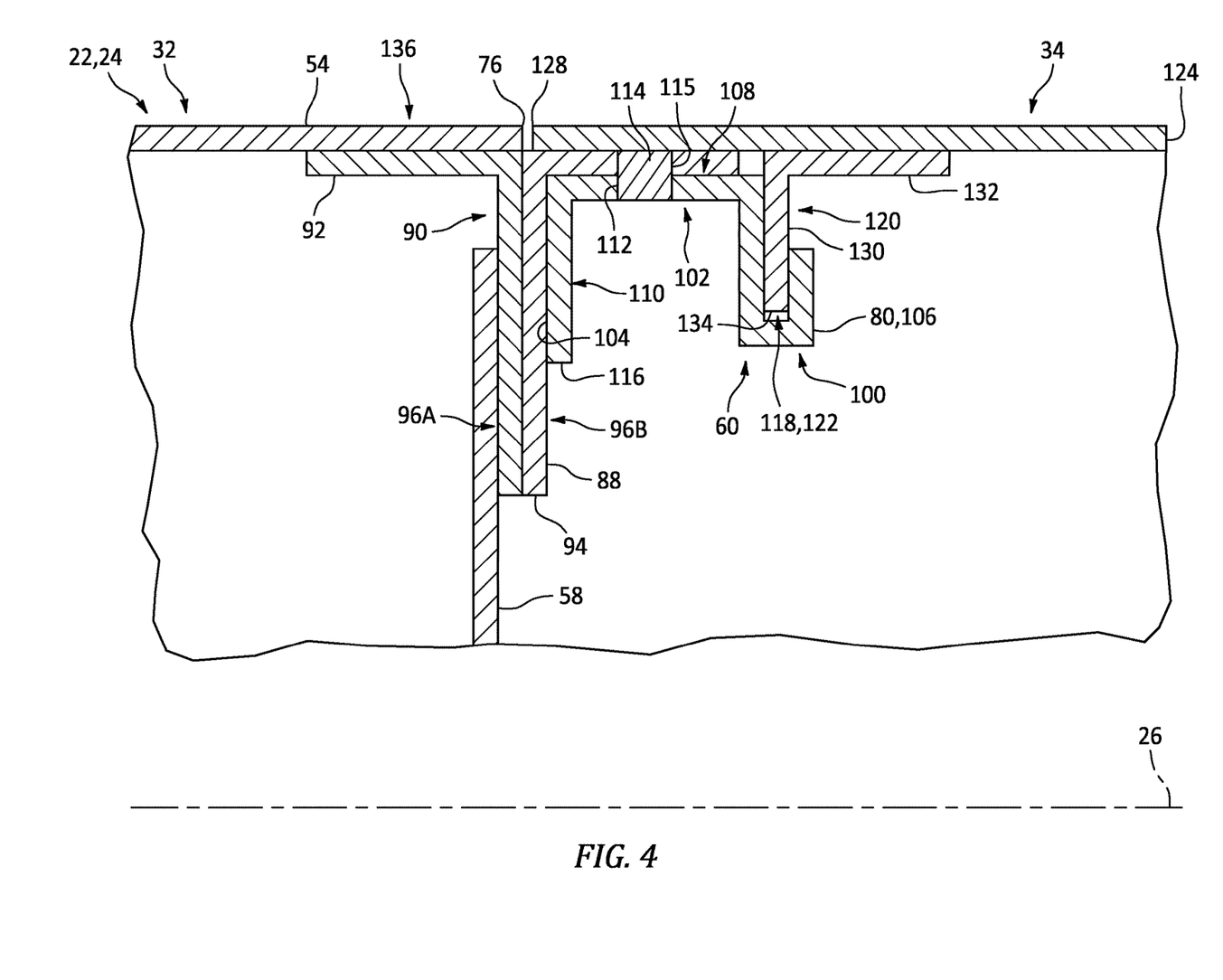
FIG. 4 is a side sectional illustration of a portion of the propulsion system assembly where a cowl interfaces with an inlet structure.

The aft bulkhead 58 is arranged at an aft end 80 of the inlet structure 32; see also FIG. 4. The aft bulkhead 58 extends circumferentially about (e.g., completely around) the centerline 26. The aft bulkhead 58 extends radially between the inner barrel 50 and the outer barrel 54. The aft bulkhead 58 of FIG. 2 is radially outboard of and extends circumferentially about (e.g., circumscribes) the inner barrel 50. The aft bulkhead 58 of FIG. 2 is radially inboard of the outer barrel 54, where the outer barrel 54 extends circumferentially about (e.g., circumscribes) the aft bulkhead 58.

The aft bulkhead 58 is connected to the inner barrel 50 at its aft end 64. The aft bulkhead 58 of FIG. 2, for example, is mechanically fastened, bonded and/or otherwise attached to a flange 82 of an inner support structure 84; e.g., an annular inner bulkhead frame. A base 86 of this inner support structure 84 is connected to the inner barrel 50 such that the inner support structure 84 couples the inner barrel 50 and the aft bulkhead 58. The inner support structure base 86 of FIG. 2 is also connected to the fan case 42 such that the inner support structure 84 couples the inner barrel 50 and the fan case 42. The present disclosure, however, is not limited to such an exemplary coupling between the nacelle elements.

An outer support structure 90 (e.g., an annular outer bulkhead frame) is provided to couple the aft bulkhead 58 and the outer barrel 54. This outer support structure 90 of FIG. 2 includes a flange 88 and a base 92.

Referring to FIG. 4, the outer support structure 90 may have a T-shaped cross-sectional geometry when viewed, for example, in the reference plane. The outer support structure flange 88 of FIG. 4, for example, is connected to an intermediate point (e.g., a midpoint) axially along the outer support structure base 92. The outer support structure flange 88 projects radially inward from the outer support structure base 92, towards the centerline 26 and the inner barrel 50 (see FIG. 2), to an inner distal end 94 of the outer support structure flange 88.

Figure 5:
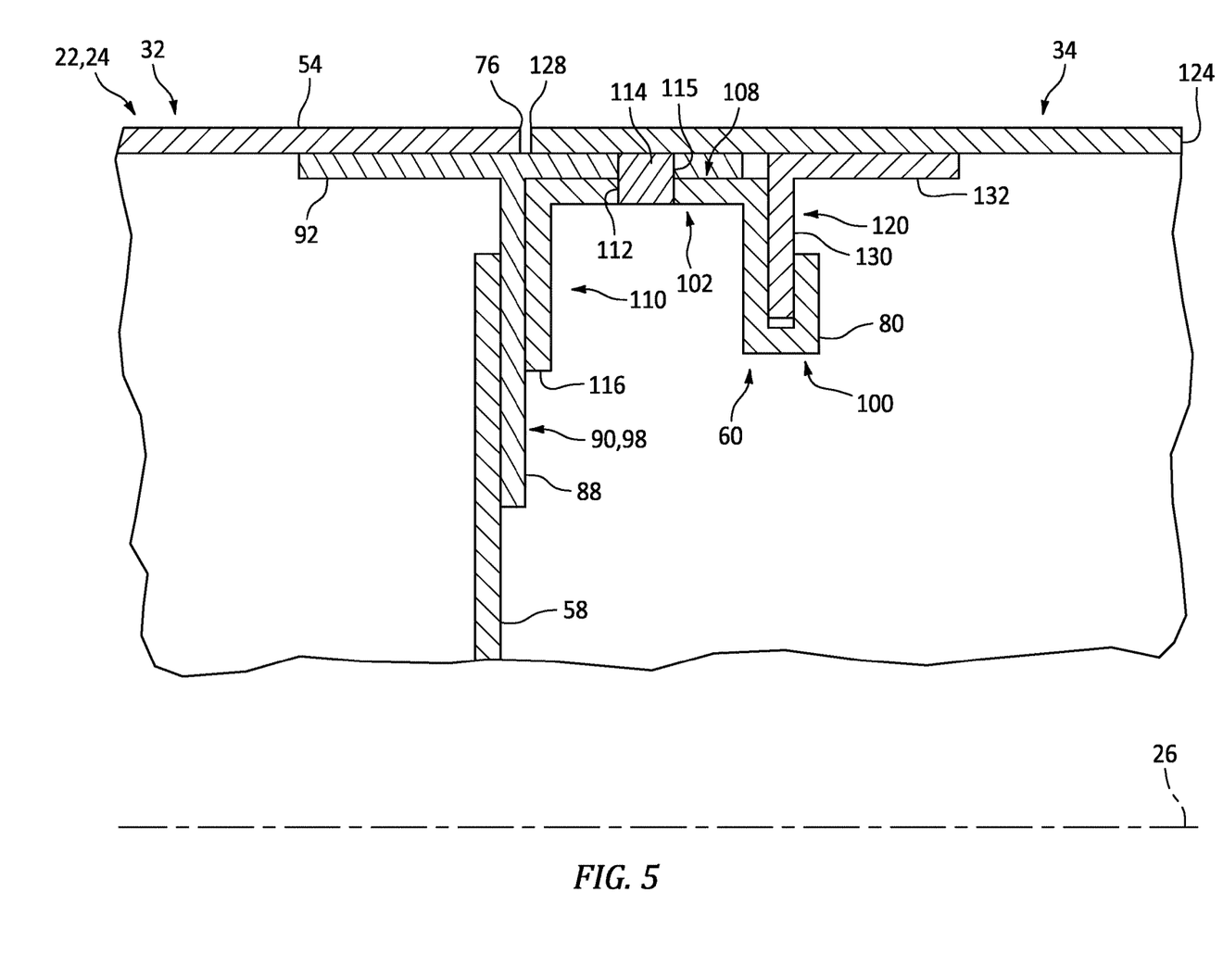
FIG. 5 is a side sectional illustration of a portion of the propulsion system assembly with another support structure configuration.

The outer support structure 90 of FIG. 4 is configured from/includes a forward frame 96A and an aft frame 96B. Each of these frames 96A and 96B (generally referred to as "96") may have an L-shaped cross-sectional geometry when viewed, for example, in the reference plane. The forward frame 96A and the aft frame 96B may thereby be arranged together back-to-back to provide the outer support structure 90 with its T-shaped cross-sectional geometry. Alternatively, referring to FIG. 5, the outer support structure 90 may be configured as a unitary body 98 (e.g., an annular T-frame) with the T-shaped cross-sectional geometry. The present disclosure, however, is not limited to the foregoing exemplary outer support structure configurations.

Referring to FIG. 2 (see also FIGS. 4 and 5), the aft bulkhead 58 is connected to the outer barrel 54 at its aft end 76. The aft bulkhead 58 of FIG. 2, for example, is mechanically fastened, bonded and/or otherwise attached to the outer support structure flange 88. The outer support structure base 92 is connected to and radially inboard of the outer barrel 54 such that the outer support structure 90 couples the outer barrel 54 and the aft bulkhead 58. The outer support structure base 92 also provide a mount for the fitting 60.

Referring to FIG. 4, each fitting 60 is configured with a locator clip 100 and a hoist bracket 102 that is integrated with the locator clip 100. The fitting 60 of FIG. 4, for example, is configured as a monolithic body. The term "monolithic body" may describe a body which is cast, forged, machined, additively manufactured and/or otherwise formed as a single, unitary body. By contrast, a non-monolithic body includes a plurality of discretely formed members which are mechanically fastened or otherwise removably attached together following their formation. The hoist bracket 102 of FIG. 4, in particular, is formed with, part of and/or otherwise configured with the locator clip 100 in the respective (e.g., monolithic) fitting 60. Such a configuration may reduce inlet structure weight and complexity.

The fitting 60 of FIG. 4 extends axially along the centerline 26 between and to a forward end 104 of the fitting 60 and an aft end 106 of the fitting 60. The fitting 60 extends circumferentially about (e.g., partially around) the centerline 26 providing the fitting 60 with, for example, an arcuate body. The fitting 60 of FIG. 4 includes a fitting base 108, a fitting flange 110 (e.g., a rim) and the locator clip 100.

The fitting base 108 extends axially along the centerline 26 between and is connected to the fitting flange 110 and the locator clip 100. This fitting base 108 is configured with the hoist bracket 102. The fitting base 108 of FIG. 4, for example, includes a hoist bracket receptacle 112; e.g., a threaded aperture. This bracket receptacle 112 projects radially through (or into) the fitting base 108. The bracket receptacle 112 may receive a plug 114 when the aircraft propulsion system 20 is assembled. The plug 114 of FIG. 4, for example, is mated with (e.g., inserted into, threaded into, etc.) the bracket receptacle 112 as well as a corresponding aperture 115 in the outer support structure 90 and its base 92. However, for assembly and/or disassembly of the nacelle 22 (e.g., coupling or uncoupling of the inlet structure 32), the plug 114 is removed from the bracket receptacle 112 as described below in further detail. It is also contemplated the plug 114 may be omitted and the bracket receptacle 112 (and the aperture 115) may be empty when the hoist bracket 102 is not being utilized as for a structural lift point.

The fitting flange 110 is disposed at the fitting forward end 104. This fitting flange 110 projects radially inward from the fitting base 108 to an inner distal end 116 of the fitting flange 110.

The locator clip 100 is disposed at the fitting aft end 106. The locator clip 100 is configured with a locator receptacle 118 configured to receive an axial cowl locator 120 with a respective one of the cowls 34. The locator receptacle 118 of FIG. 4, for example, is configured as a groove 122 formed by the locator clip 100. The groove 122 of FIG. 4, in particular, projects radially inward into the locator clip 100 to a groove end. This groove 122 extends axially along the centerline 26 within the locator clip 100 between opposing groove sides. The groove 122 extends circumferentially within, into or through the locator clip 100 about the centerline 26. With this configuration, the locator clip 100 may have a U-shaped or V-shaped cross-sectional geometry when viewed, for example, in the reference plane.

The fitting 60 may be mated with (e.g., nested within) the outer support structure 90. The fitting base 108 of FIG. 4, for example, is disposed radially within a portion of the outer support structure base 92 axially aft of the outer support structure flange 88, where the outer support structure 90 extends circumferentially about the fitting 60. This fitting base 108 radially engages (e.g., is abutted against and contacts) the outer support structure base 92. The fitting base 108 is mechanically fastened (e.g., via one or more fasteners) and/or otherwise connected to the outer support structure base 92. The fitting flange 110 axially engages (e.g., is abutted against and contacts) the outer support structure flange 88. The fitting flange 110 is mechanically fastened (e.g., via one or more fasteners) and/or otherwise connected to the outer support structure flange 88. With this arrangement, the outer support structure 90 structurally ties the fitting 60 to the inlet structure 32. The outer support structure 90 of FIG. 4, for example, couples the fitting 60 to the aft bulkhead 58 and the outer barrel 54.

Each cowl 34 of FIG. 4 includes an outer panel 124 (e.g., a bond panel) and at least one of the cowl locators 120. The cowl 34 and its outer panel 124 extend axially along the centerline 26 in a forward direction from an aft end 126 (see FIG. 1) of the cowl 34 to a forward end 128 of the cowl 34. The cowl 34 and its outer panel 124 extends circumferentially about (e.g., partially around) the centerline 26 providing the cowl 34 with, for example, an arcuate body. The outer panel 124 is also disposed radially outboard of and extends circumferentially about the cowl locator 120.

The cowl locator 120 of FIG. 4 includes a locator protrusion 130 (e.g., a blade, a flange, a post, etc.) and a locator base 132 connected to the outer panel 124. The locator protrusion 130 is connected to (e.g., formed integral with) the locator base 132. This locator protrusion 130 may be disposed at an axial forward end of the cowl locator 120, and projects radially inward from the locator base 132 to an inner distal end 134 of the locator protrusion 130.

Figure 6:
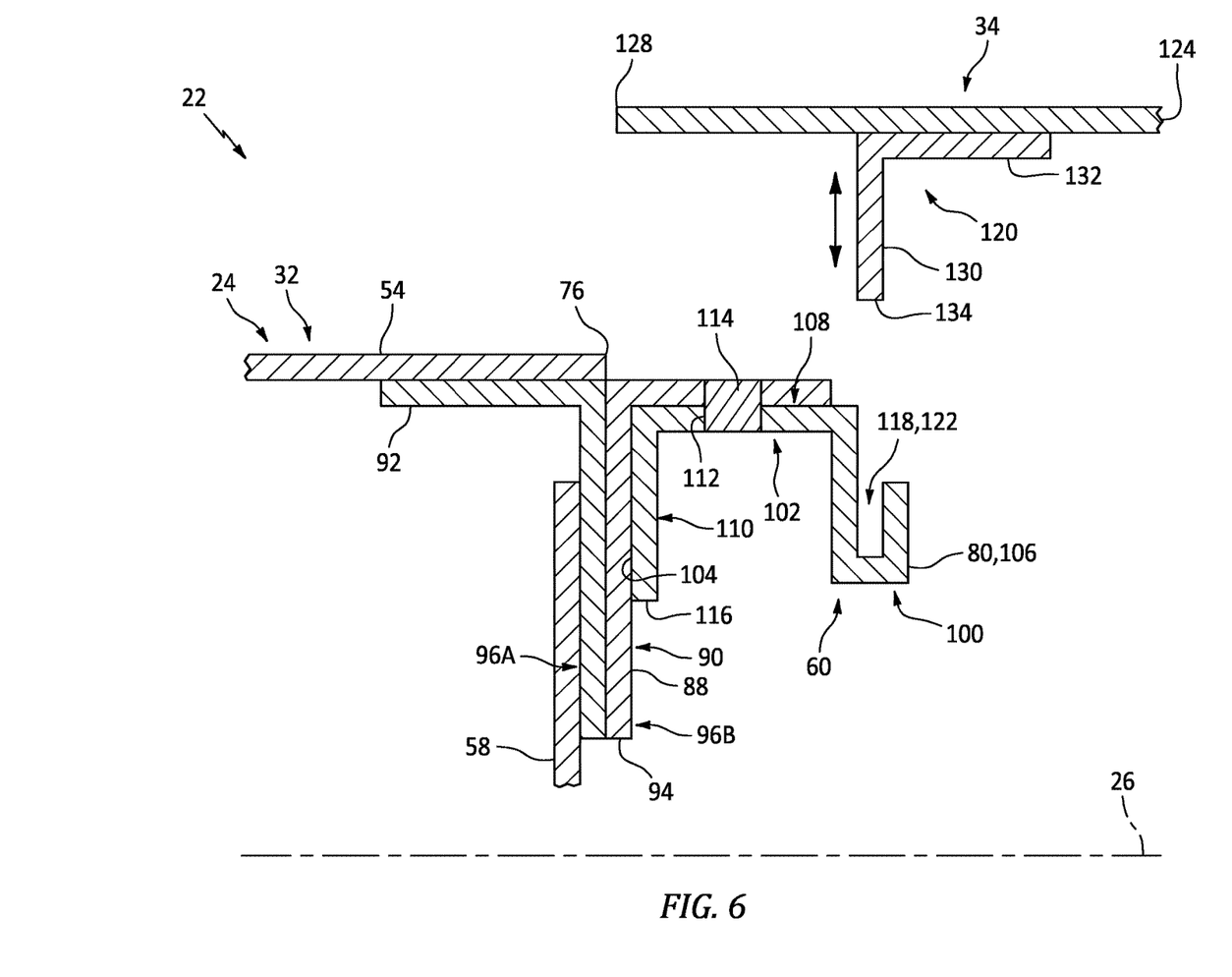
FIG. 6 is a side sectional illustration of a portion of the propulsion system assembly where the cowl is partially open.

When the cowl 34 of FIG. 4 is in its closed (e.g., stowed) position (see also FIG. 3A), the cowl locator 120 is mated with/coupled with the respective locator clip 100. The locator protrusion 130 of FIG. 4, for example, is received by the respective locator receptacle 118. In particular, the locator protrusion 130 projects radially into the locator receptacle 118 and its groove 122. With this arrangement, the cowl locator 120 may axially locate the respective cowl 34 with respect to the locator clip 100 and the rest of the inlet structure 32. The cowl locator 120 and the locator clip 100 may also axially engage (e.g., abut, contact, etc.) one another to provide an axial load path between the respective cowl 34 and the inlet structure 32. In addition, the cowl 34 of FIG. 4 and its outer panel 124 are axially positioned next to (e.g., abutted against) the outer barrel 54 such that the cowl 34 and its outer panel 124 axially and circumferentially cover the fitting 60 and an exposed portion of the outer support structure 90. The plug 114 may thereby not create any flow disruptions in an exterior aero surface 136 of the nacelle 22 and its inlet structure 32. By contrast, referring to FIG. 6, where the cowls 34 are partially or completely opened (see also FIG. 3B), each cowl locator 120 may be decoupled from the respective locator clip 100; e.g., each locator protrusion 130 may be discrete from (e.g., out of) the locator receptacle 118. The cowl 34 of FIG. 6 and its outer panel 124 also uncover the fitting 60 and the exposed portion of the outer support structure 90.

Figure 7:
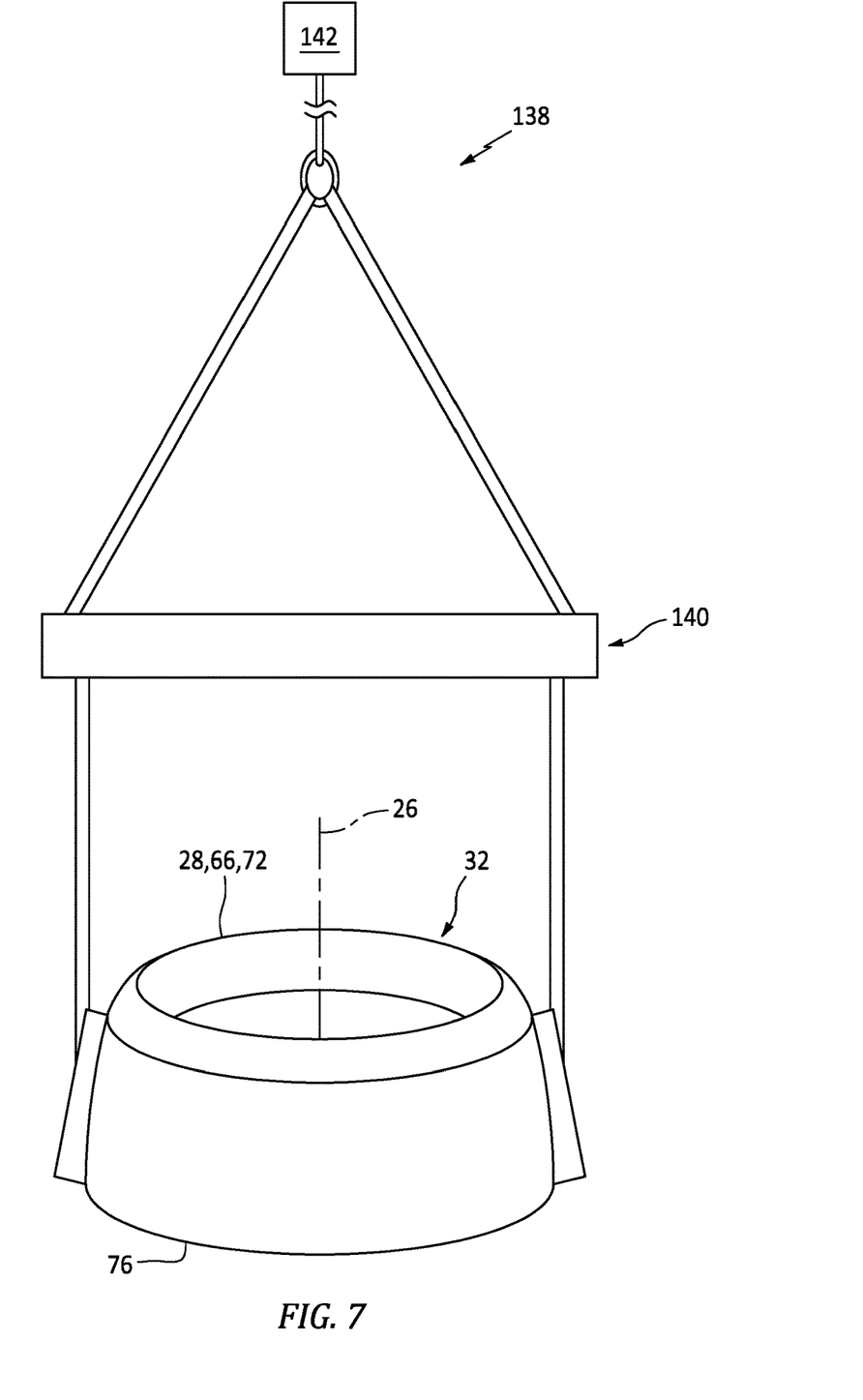
FIG. 7 is a perspective illustration of the inlet structure held by a hoist system.

FIG. 7 illustrates a hoist system 138 arranged with and coupled to the inlet structure 32. This hoist system 138 is configured to support (e.g., hold) and/or manipulate (e.g., translate, shift, rotate or otherwise move) the inlet structure 32 during assembly and/or disassembly of the nacelle 22. The inlet structure 32, for example, may be held and/or manipulated using the hoist system 138 for installation of the inlet structure 32 with other structure(s) (e.g., the fan case 42 of FIG. 2) of the aircraft propulsion system 20. The inlet structure 32 may also or alternatively be held and/or manipulated using the hoist system 138 for removal of the inlet structure 32 from the other structure(s) of the aircraft propulsion system 20. Note, while the hoist system 138 is holding the inlet structure 32 vertically in FIG. 7, the hoist system 138 may also or alternatively hold the inlet structure 32 horizontally and/or at various other orientations.

Figure 8:
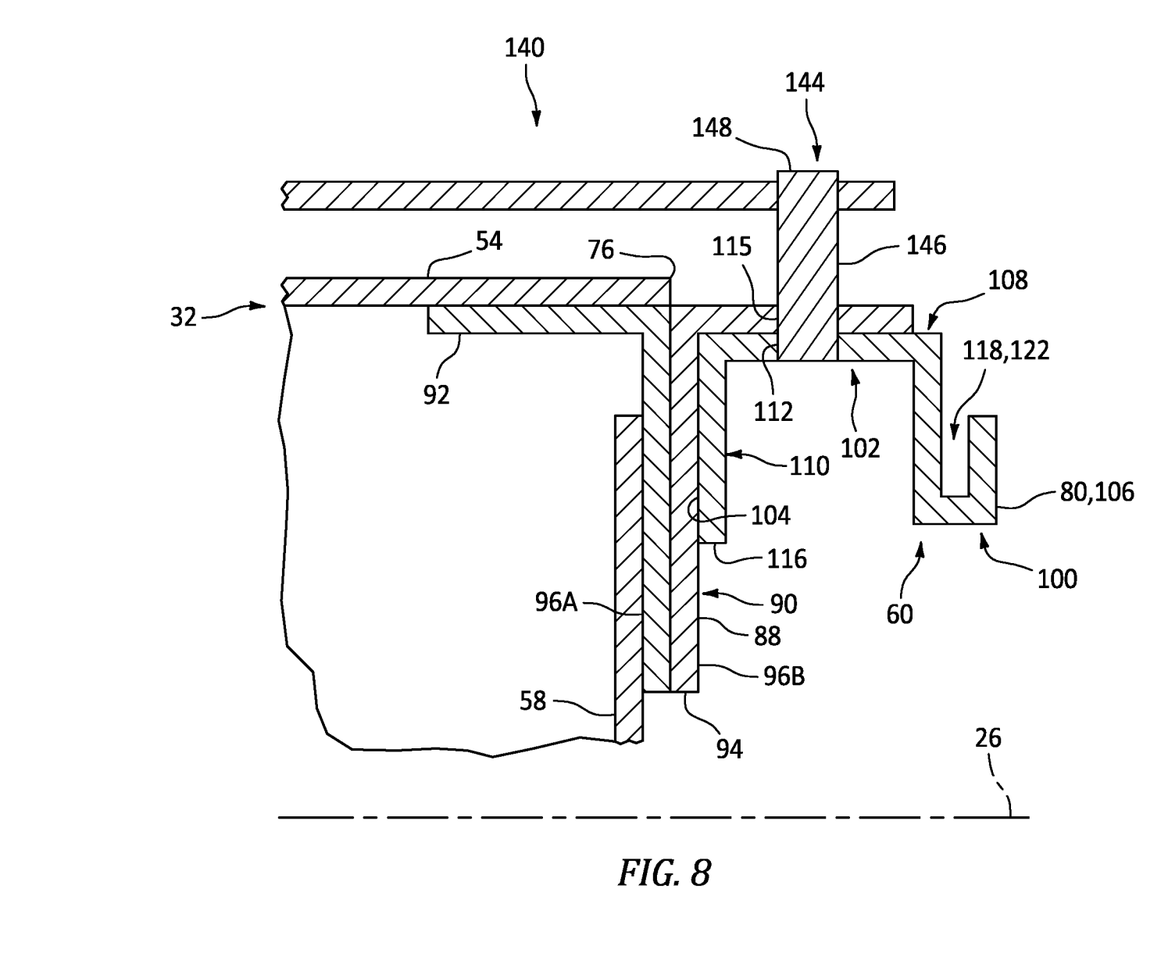
FIG. 8 is a side sectional illustration of a portion of the inlet structure coupled with a hoist fixture.

The hoist system 138 of FIG. 7 includes a hoist fixture 140 and a hoist 142 coupled to the hoist fixture 140. The hoist fixture 140 is configured as a cradle or other support for the inlet structure 32 which couples the inlet structure 32 to the hoist 142. The hoist fixture 140 of FIG. 7 is arranged outside of/external to the inlet structure 32. Referring to FIG. 8, the hoist fixture 140 is connected to each hoist bracket 102 through a respective hoist fastener 144; e.g., a hoist pin. This hoist fastener 144 is received by (e.g., inserted into, threaded into, etc.) a respective one of the bracket receptacles 112. An exterior portion 146 of the hoist fastener 144 of FIG. 8 projects radially out from the inlet structure 32 and its elements 60 and 90 to a distal end 148 outside of/external to the inlet structure 32. This fastener portion 146 is (e.g., fixedly or movably) connected to the hoist fixture 140. The hoist fasteners 144 may thereby couple and structurally tie the inlet structure 32 to the hoist fixture 140.

Figure 9:
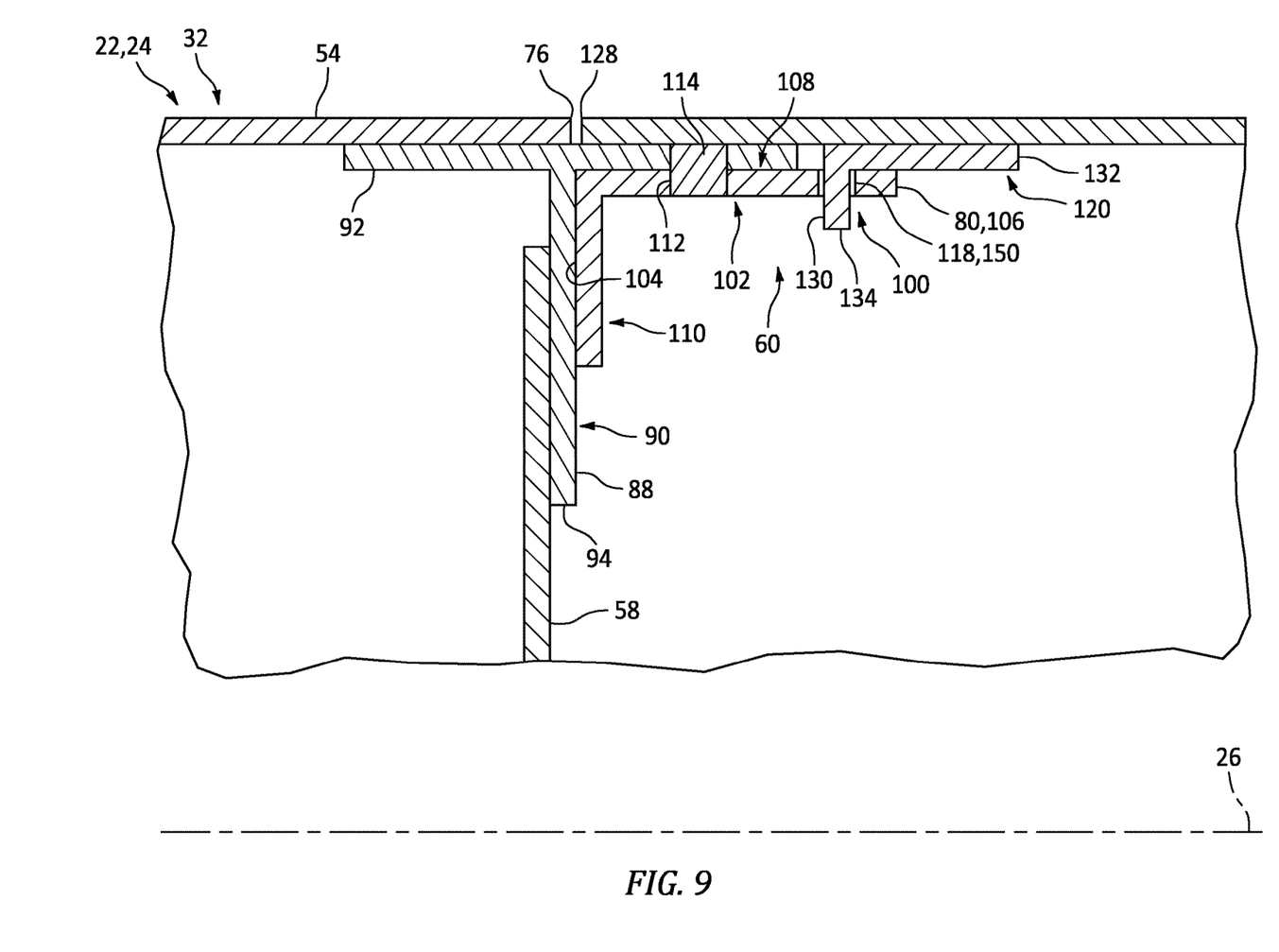
FIG. 9 is a side sectional illustration of a portion of the propulsion system assembly with another locator clip configuration.

In some embodiments, referring to FIG. 9, the locator clip 100 may be configured as part of the fitting base 108. The locator receptacle 118 of FIG. 9, for example, is configured as a slot 150. This slot 150 projects radially through the fitting base 108. The slot 150 extends axially along the centerline 26 within the fitting base 108 between opposing sides of the slot 150. The slot 150 extends circumferentially within the fitting base 108 about the centerline 26. In this embodiment of FIG. 9, the locator protrusion 130 projects radially through (or partially into) the slot 150 to mate/couple the cowl locator 120 and the locator clip 100.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle comprising an inlet structure and a cowl;
   the inlet structure extending axially in a first direction along a centerline to an inlet structure aft end, the inlet structure comprising a clip and a hoist bracket integrated with the clip, the clip at the inlet structure aft end and comprising a locator receptacle, and the hoist bracket configured to provide a structural lift point for the inlet structure during assembly and/or disassembly of the nacelle; and
   the cowl extending axially in a second direction along the centerline to a cowl forward end, the cowl comprising a locator at the cowl forward end, and the locator comprising a protrusion received by the locator receptacle.

2. The assembly of claim 1, further comprising:
   a hoist system coupled to the hoist bracket;
   the hoist system configured to hold the inlet structure during the assembly and/or the disassembly of the nacelle.

3. The assembly of claim 2, wherein
   the hoist system includes a hoist fixture and a hoist;
   the hoist fixture is coupled to the hoist bracket and holds the inlet structure; and
   the hoist is coupled to the hoist fixture.

4. The assembly of claim 1, further comprising:
   a fastener mated with a fastener aperture in the hoist bracket during the assembly and/or the disassembly of the nacelle;
   the fastener projecting radially outward from the inlet structure.

5. The assembly of claim 1, further comprising a plug mated with a fastener aperture in the hoist bracket during operation of the aircraft propulsion system.

6. The assembly of claim 1, wherein the hoist bracket is axially covered by the cowl.

7. The assembly of claim 1, wherein the clip and the hoist bracket are configured together in a monolithic body.

8. The assembly of claim 1, wherein
   the inlet structure further includes a fitting;
   the fitting includes a base, a flange and the clip;
   the base extends axially between and is connected to the flange and the clip, and the base comprises the hoist bracket; and
   the flange projects radially inward from the base.

9. The assembly of claim 1, wherein
   the inlet structure further includes a fitting;
   the fitting includes a base and a flange;
   the locator receptacle extends radially through the base, and the hoist bracket comprises a bracket receptacle that extends radially through the base; and
   the flange is connected to and projects radially inward from the base.

10. The assembly of claim 1, wherein
    the inlet structure further includes a bulkhead and an outer barrel;
    the outer barrel circumscribes and is connected to the bulkhead; and
    a fitting comprising the clip and the hoist bracket is connected to the bulkhead.

11. The assembly of claim 1, wherein
    the locator receptacle comprises a groove formed by the clip; and
    the protrusion projects radially into the groove.

12. The assembly of claim 1, wherein
    the locator receptacle comprises a slot; and
    the protrusion projects radially through the slot.

13. The assembly of claim 1, wherein
    the inlet structure further includes an outer barrel; and
    the cowl further includes an outer panel circumscribing the clip, the hoist bracket and the locator, and the outer panel is axially abutted with the outer barrel.

14. The assembly of claim 1, wherein
    the cowl is configured to move between a closed position and an open position;
    the protrusion is received by the locator receptacle when the cowl is in the closed position; and
    the protrusion is outside of the locator receptacle when the cowl is in the open position.

15. The assembly of claim 1, wherein the clip and the locator are configured to provide an axial load path between the inlet structure and the cowl when the locator is received by the locator receptacle.

16. An assembly for an aircraft propulsion system, comprising:
    a nacelle comprising an inlet structure and a cowl;
    the inlet structure extending axially along and circumferentially about a centerline, the inlet structure comprising a clip and a hoist bracket configured with the clip in a monolithic body, and the hoist bracket configured to provide a structural lift point for the inlet structure during assembly and/or disassembly of the nacelle; and
    the cowl extending axially along and circumferentially about the centerline, the cowl configured to pivot between a closed position and an open position, the cowl comprising a locator configured to
    coupled with the clip when the cowl is in the closed position; and
    uncoupled from the clip when the cowl is in the open position.

17. The assembly of claim 16, further comprising:
    a hoist fixture outside of the inlet structure during the assembly and/or the disassembly of the nacelle;
    the hoist fixture coupled to the inlet structure through the hoist bracket.

18. The assembly of claim 16, further comprising:
a hoist pin mated with an aperture in the hoist bracket during the assembly and/or the disassembly of the nacelle;
the hoist pin projecting radially out from an exterior of the inlet structure.

19. An assembly for an aircraft propulsion system, comprising:
a nacelle inlet structure extending axially along a centerline between a forward end and an aft end, the nacelle inlet structure including an inlet lip, an inner barrel, an outer barrel, a bulkhead and a fitting;
the inlet lip at the forward end;
the inner barrel connected to the inlet lip;
the outer barrel connected to the inlet lip and circumscribing the inner barrel;
the bulkhead extending radially between and connected to the inner barrel and the outer barrel; and
the fitting at the aft end and connected to the bulkhead, the fitting including a locator clip and a hoist bracket, the locator clip comprising a receptacle configured to receive a locator for a nacelle cowl, and the hoist bracket configured to provide a structural lift point for connecting to a hoist system during nacelle assembly and/or nacelle disassembly.

20. The assembly of claim 19, wherein the nacelle inlet structure further includes a support structure coupling the outer barrel to the bulkhead.

\* \* \* \* \*